United States Patent [19]
Wittren

[11] 4,038,886
[45] Aug. 2, 1977

[54] FORWARD, NEUTRAL AND REVERSE V-BELT PLANETARY DRIVE

[75] Inventor: Richard Arthur Wittren, Cedar Falls, Iowa

[73] Assignee: Deere & Company, Moline, Ill.

[21] Appl. No.: 669,321

[22] Filed: Mar. 22, 1976

[51] Int. Cl.² .................. F16H 9/26; F16H 11/02
[52] U.S. Cl. .................................................. 74/793
[58] Field of Search ............... 74/689, 230.17 A, 793

[56] References Cited

U.S. PATENT DOCUMENTS

| | | | |
|---|---|---|---|
| 2,459,969 | 1/1949 | Schweickart | 74/793 |
| 2,566,997 | 9/1951 | Schweickart | 74/793 |
| 2,941,421 | 6/1960 | Plotti | 74/689 |

FOREIGN PATENT DOCUMENTS

| | | | |
|---|---|---|---|
| 951,064 | 9/1956 | Germany | 74/689 |
| 579,285 | 7/1946 | United Kingdom | 74/689 |

*Primary Examiner*—Samuel Scott
*Assistant Examiner*—Allan R. Burke

[57] ABSTRACT

A variable speed drive includes a planetary set of two adjustable V-belt pulleys orbitally driven around a non-rotatable, or fixed, adjustable sun pulley and a rotatable, adjustable output sun pulley attached to an output shaft. The orbiting planet pulleys are carried on a radial arm driven by the input shaft and have adjustable, inversely proportional effective diameters which are wrapped by V-belts connecting the planet pulleys to the sun pulleys. The effective diameter of the fixed sun pulley is adjusted by a control rod and the effective diameter of the output sun pulley is biased towards its maximum effective diameter. When all four pulleys are at the same effective diameter, orbiting of the planetary set will produce zero output. When the effective diameter of the fixed sun pulley is varied by the control rod, the V-belts will assume new effective diameters on all four pulleys causing the output speed to vary. The output speed can be varied without an interruption of power from the zero output position to a maximum forward or reverse depending upon whether the effective diameter of the non-rotating sun pulley is respectively decreased or increased from the zero output effective diameter.

4 Claims, 1 Drawing Figure

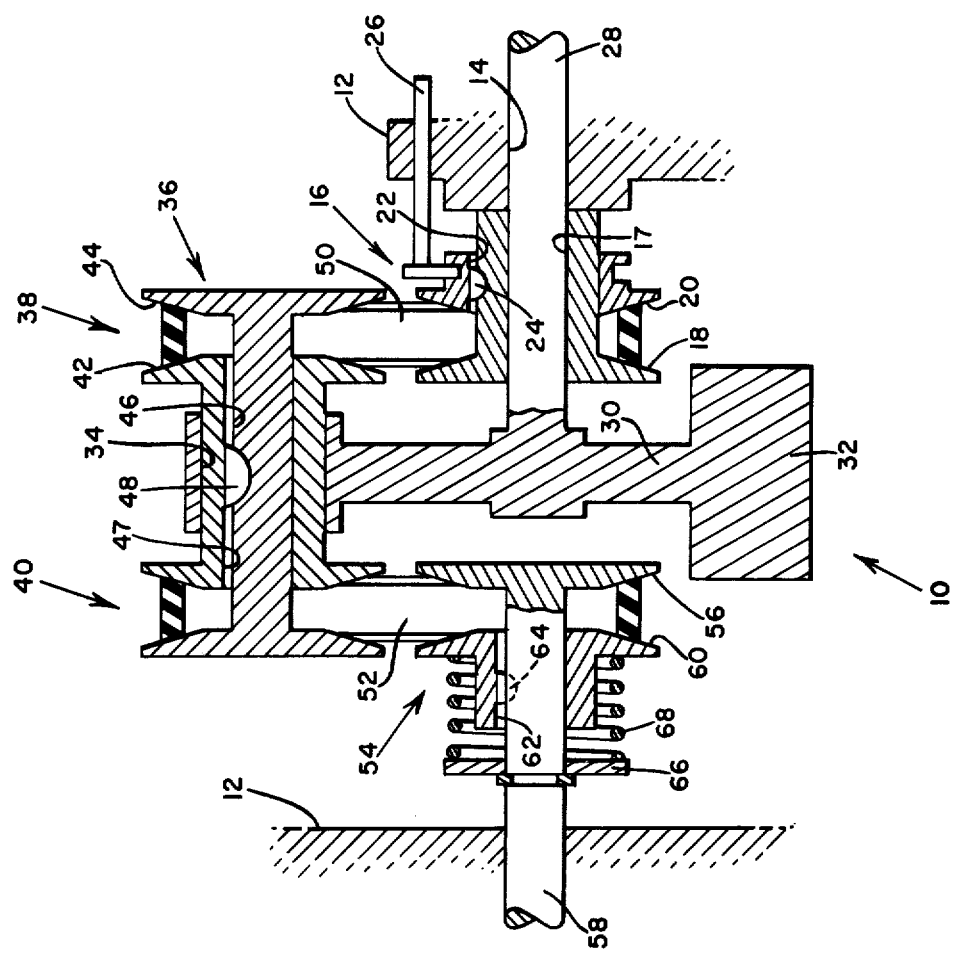

FORWARD, NEUTRAL AND REVERSE V-BELT PLANETARY DRIVE

BACKGROUND OF THE INVENTION

The present invention relates generally to variable speed drives and more particularly to a planetary V-belt variable speed drive.

In the past, it was desirable to provide a belt transmission in which the operator control was effective solely by changing the effective diameters of the variable speed sheaves without need for clutches or any other mechanisms. Heretofore, there have been no simple, straightforward mechanisms for converting a uni-directional input into a bi-directional output without some interruption of power.

SUMMARY OF THE INVENTION

The present invention provides a planetary, V-belt, variable speed drive in which the effective diameter of only one of four pulleys need be controlled in order to obtain output ranging from full forward to full reverse through zero output without an interruption of power.

In accordance with the present invention, there is provided a planetary pulley system having a fixed sun and output sun pulleys orbited by a planet pulley set on a driven input arm wherein the total angular motion of any pulley is equal to the angular motion of the input arm minus the angular motion of the pulley relative to the arm.

The above and additional advantages of the present invention will become apparent to those skilled in the art from a consideration of the following detailed description of the preferred embodiment when taken in conjunction with the accompanying drawing.

BRIEF DESCRIPTION OF THE DRAWING

The drawing is a side cross-sectional elevational view of the variable speed drive made in accordance with the present invention.

DESCRIPTION OF THE PREFERRED EMBODIMENT

Referring now to the drawing, therein is shown a variable speed drive 10 having a housing 12. The housing 12 includes a pulley bore 14 therethrough.

A fixed, or nonrotatable, sun pulley 16 having an axial bore 17 is positioned coaxially with the pulley bore 14. The fixed sun pulley 16 includes a non-rotatable flange member 18 secured to the housing 12 by conventional means and an adjustable flange member 20 encircling and axially slidable on the flange member 18. The adjustable flange member 20 contains a keyway 22 parallel to its axis which is slidable over a key 24 inserted in the flange member 18. A control input, to move the adjustable flange member 20 axially, is provided by a control rod 26. The flange members 18 and 20 cooperate to define an outwardly diverging V-recess of adjustable effective diameter. In a V-belt pulley, when the width of the V-recess increases the pulley's effective diameter decreases and vice versa.

An input shaft 28 is rotatably positioned in the pulley bore 14 and extends through the sun pulley bore 17. At one end of the input shaft 28 is an arm portion 30 extending perpendicular to the axis of the input shaft 28 and including a counterweight 32 at one extremity and a planetary set bore 34 at the other. The planetary set bore 34 is parallel to the pulley bore 14 and rotatably carries a planetary set 36 consisting of a first and second planet pulleys 38 and 40.

The first and second planet pulleys 38 and 40 include a movable flange member 42 rotatable in the planetary set bore 34 and an axially adjustable flange member 44 slidable in a bore 46 provided in the flange member 42. The flange member 42 is provided with an internal keyway 47 which is slidable over a key 48 inserted in the flange member 44. The flange members 42 and 44 cooperate to form a pair of outwardly diverging V-recesses, one on either side of the arm portion 30, whose widths are inversely adjustable so as to cause the effective diameter of one planet pulley to increase as the other decreases.

The first planet pulley 38 is connected by a first V-belt 50 to the fixed sun pulley 16. The second planet pulley 40 is connected by a second V-belt 52 to an output sun pulley 54.

The output sun pulley 54 is coaxial with the input shaft 28 and contains an axially fixed flange member 56 which is integral with an output shaft 58 and an adjustable flange member 60 which encircles and is coaxial with the flange member 56. The adjustable flange member 60 is provided with an internal keyway 62 parallel to the axis of the output shaft 58 and slidable over a key 64 inserted in the output shaft 58. The output shaft 58 is encircled by an axially fixed spring stop 66 which is abutted by a spring 68 which urges the adjustable flange member 60 towards the axially fixed flange member 56. The flange members 56 and 60 cooperate to define an outwardly diverging V-recess of adjustable width which, due to the loading of the spring 68, is biased towards its maximum effective diameter.

The basic principle involved in the present invention is that the total angular motion of any pulley is equal to the angular motion of the output arm minus the angular motion of the pulley relative to the arm.

In the neutral zone output diameter, or position, as shown in the drawing wherein the effective diameters of all the pulleys are equal, rotation of the input shaft 28 causes rotation of the arm portion 30. The planetary set 36, dynamically counterbalanced by the counterweight 32, orbits around the fixed sun pulley 16. With the control rod 26 positioning the adjustable flange member 20 in the neutral position, the first planet pulley 38 will be moved by the first V-belt 50 to its neutral position wherein one orbit of the planetary set 36 will result in one rotation in the opposite direction of the first and second planet pulleys 38 and 40. With the first planet pulley 38 moved to its neutral position, the second planet pulley 40 will also be moved by the adjustable flange member 44 to its neutral position, and further since the output sun pulley 54 is biased towards the maximum effective diameter position, the output sun pulley 54 will be moved to its neutral position. The orbiting of the planetary set 36 will be cancelled out by the reverse rotation of the second planet pulley 40, and thus the net output or angular motion imparted to the output sun pulley 54 will be zero.

To vary the output from zero to a maximum forward, the control rod 26 is moved to slide the adjustable flange member 20 away from the flange member 18 to decrease the effective diameter of the fixed sun pulley 16 to its minimum. As the effective diameter of the fixed sun pulley 16 is decreased, the effective diameter of the first planet pulley 38 is increased since the biasing of the output sun pulley 54 towards its maximum diameter acting through the wedging action of the V-sides of the second V-belt 52 forces the second planet pulley 40 towards its minimum effective diameter causing axial movement of the adjustable flange member 44. The smaller effective diameter of the fixed sun pulley 16 causes less of a rotation of the first and second planet pulleys 38 and 40 for every orbit of the planet set 36. With less than a full rotation of the first and second planet pulleys 38 and 40 for every orbit of the planetary set 36, the output sun pulley 54 is rotated in the same direction as the input shaft 28, thus causing an output on the output shaft 58 in the forward direction.

To vary the output speed from zero to a maximum reverse, the control rod 26 is moved to increase the effective diameter of the fixed sun pulley 16 to its maximum. As the effective diameter of the fixed sun pulley 16 is increased, the effective diameter of the first planet pulley 38 is forced to decrease and thus the effective diameter of the second planet pulley 40 is caused to increase resulting in a decrease of the effective diameter of the output sun pulley 54. As the effective diameter of the fixed sun pulley 16 increases, the first planet pulley 38 rotates more than one revolution per orbit of the planetary set 36. With more than one revolution of the first and second planet pulleys 38 and 40 for every orbit of the planetary set 36, the output sun pulley 54 is caused to rotate in the opposite direction from the input shaft 28, thus causing an output on the output shaft 58 in the reverse direction.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which will fall within the spirit and scope of the appended claims.

I claim:

1. A variable speed drive comprising: sun pulley means having an adjustable effective diameter and non-rotatably positioned about a central axis, said sun pulley means having an axial bore therethrough and having an adjustable effective diameter; means for changing the effective diameter of the sun pulley means; input arm means rotatable in the axial bore and having a planet bore provided therein with an axis parallel to and orbital about the central axis; planet pulley means rotatably positioned in the planet bore including a first and second pulley respectively having first and second inversely adjustable effective diameters disposed on either side of said input arm means; first V-belt means wrapping the effective diameter of the sun pulley means and the first effective diameter of the planet pulley means; output pulley means having an adjustable effective diameter biased towards the maximum effective diameter and rotatable about the central axis; and second V-belt means wrapping the effective diameter of the output pulley means and the second effective diameter of the planet pulley means.

2. The variable speed drive as claimed in claim 1 wherein the arm means includes counterweight means opposite the planet pulley means for dynamically balancing the input arm means, the planet pulley means, the first and second V-belt means.

3. A variable speed drive comprising: sun pulley means fixed about a central axis and including a fixed flange member and an adjustable flange member cooperating to define a V-groove, the fixed flange member having an axial bore therethrough and the adjustable flange member being axially displaceable to vary the effective diameter of said sun pulley means; means for displacing the adjustable flange member; input shaft means extending through and rotatable in the axial bore in the fixed flange member, said input shaft means having arm means integral therewith and having a planetary bore provided therein with a planet axis parallel to and orbital about the central axis; planet pulley means positioned in the planet bore and including an axially movable flange means housing first and second flanges rotatable in said planet bore and having a bore provided therethrough and adjustable flanged means having first and second flanges both first flanges and both second flanges axially slidable in the bore, said flange members cooperating to define first and second V-grooves, respectively having first and second diameters on either side of said arm means, the adjustable flanged means being axially displaceable to simultaneously increase the effective diameter of one V-groove and decrease the effective diameter of the other; first V-belt means wrapping with the effective diameter of the sun pulley means and the first effective diameter of the planet pulley means whereby a change in the effective diameter of the sun pulley means changes the first effective diameter of the planet pulley means; output sun pulley means rotatable about the central axis and including an axially fixed flange member and an adjustable flange member, said flanges cooperating to define a V-groove with the adjustable flange member axially displaceable to vary the effective diameter of said output sun pulley means; means biasing the adjustable flange member of the output sun pulley means its maximum effective diameter and the second V-belt means wrapping the effective diameter of the output sun pulley means and the second effective diameter of the planet pulley means whereby a change in the second effective diameter of the planet pulley means will change the effective diameter of the output sun pulley means.

4. The variable speed drive as claimed in claim 3 wherein the arm means includes counterweight means opposite the planet pulley means for dynamically balancing the input arm means, the planet pulley means and the first and second V-belt means.

* * * * *